(12) United States Patent
Ogata et al.

(10) Patent No.: US 9,802,612 B2
(45) Date of Patent: Oct. 31, 2017

(54) VEHICLE ENGINE ACTIVATION CONTROL SYSTEM

(71) Applicants: Masatoshi Ogata, Toyota (JP); Hirokazu Kato, Nisshin (JP); Natsumi Oami, Toyota (JP); Julien Vaissaud, Brussels (BE); Kohnosuke Sobajima, Brussels (BE); Remi Delefosse, Brussels (BE)

(72) Inventors: Masatoshi Ogata, Toyota (JP); Hirokazu Kato, Nisshin (JP); Natsumi Oami, Toyota (JP); Julien Vaissaud, Brussels (BE); Kohnosuke Sobajima, Brussels (BE); Remi Delefosse, Brussels (BE)

(73) Assignees: TOYOTA JIDOSHA KABUSHIKI KAISHA, Toyota (JP); TOYOTA MOTOR EUROPE NV/SA, Zaventem (BE)

( * ) Notice: Subject to any disclaimer, the term of this patent is extended or adjusted under 35 U.S.C. 154(b) by 0 days.

(21) Appl. No.: 15/135,362

(22) Filed: Apr. 21, 2016

(65) Prior Publication Data
US 2016/0311436 A1 Oct. 27, 2016

(30) Foreign Application Priority Data

Apr. 24, 2015 (JP) .................................. 2015-089754

(51) Int. Cl.
*B60W 30/18* (2012.01)
*B60W 10/06* (2006.01)
(Continued)

(52) U.S. Cl.
CPC ..... *B60W 30/18072* (2013.01); *B60T 13/741* (2013.01); *B60W 10/06* (2013.01);
(Continued)

(58) Field of Classification Search
None
See application file for complete search history.

(56) References Cited

U.S. PATENT DOCUMENTS

2011/0082624 A1 4/2011 Yamamoto
2012/0330522 A1 12/2012 Gibson et al.
(Continued)

FOREIGN PATENT DOCUMENTS

JP H09-310629 A 12/1997
JP 2012-035773 A 2/2012
(Continued)

*Primary Examiner* — Colby M Hansen
(74) *Attorney, Agent, or Firm* — Oliff PLC

(57) ABSTRACT

A vehicle engine activation control system includes a starter connected to a battery; an idle stop control unit configured to automatically stop an engine and automatically reactivate the engine by the starter; an input unit configured to generate an operation request in response to input from a driver; an electric parking brake device including an electric motor connected to the battery, wherein the electric motor starts driving in response to the operation request; and a mediating unit configured to prohibit the reactivation of the engine by the idle stop control unit, when the electric motor is in a driving state in response to a predetermined operation request.

5 Claims, 11 Drawing Sheets

(51) Int. Cl.
*F02N 11/08* (2006.01)
*B60T 13/74* (2006.01)
*B60W 10/18* (2012.01)

(52) U.S. Cl.
CPC ....... *B60W 10/182* (2013.01); *F02N 11/0818*
(2013.01); *B60W 2030/1809* (2013.01); *B60W 2710/186* (2013.01)

(56) References Cited

U.S. PATENT DOCUMENTS

| | | | |
|---|---|---|---|
| 2013/0166153 | A1 | 6/2013 | Ito |
| 2016/0311434 | A1* | 10/2016 | Ogata ................. B60W 10/182 |
| 2016/0311435 | A1* | 10/2016 | Ogata ............. B60W 30/18072 |

FOREIGN PATENT DOCUMENTS

| | | |
|---|---|---|
| JP | 4924757 B2 | 4/2012 |
| JP | 2013-151884 A | 8/2013 |
| JP | 5413518 B2 | 2/2014 |
| JP | 2015-121203 A | 7/2015 |

* cited by examiner

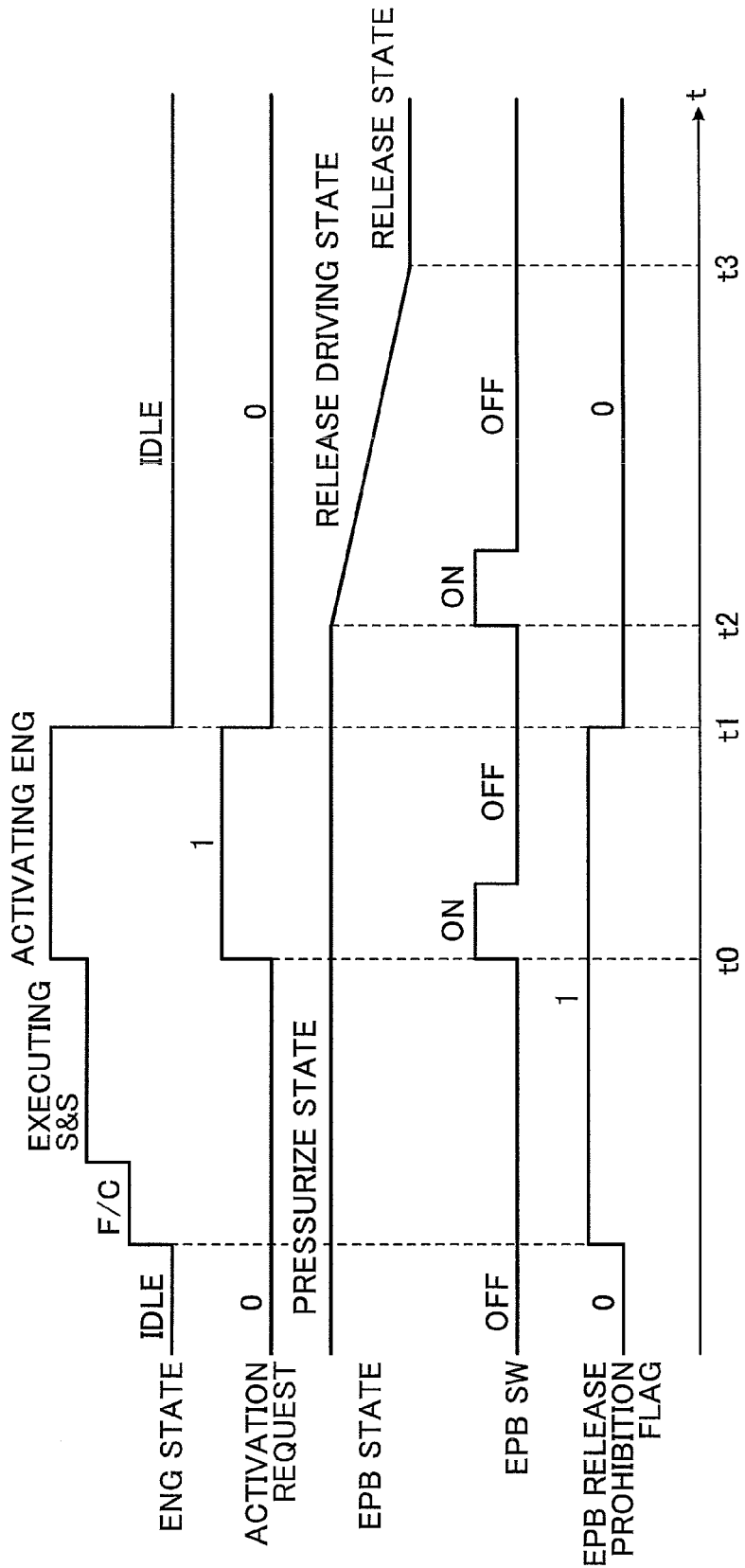

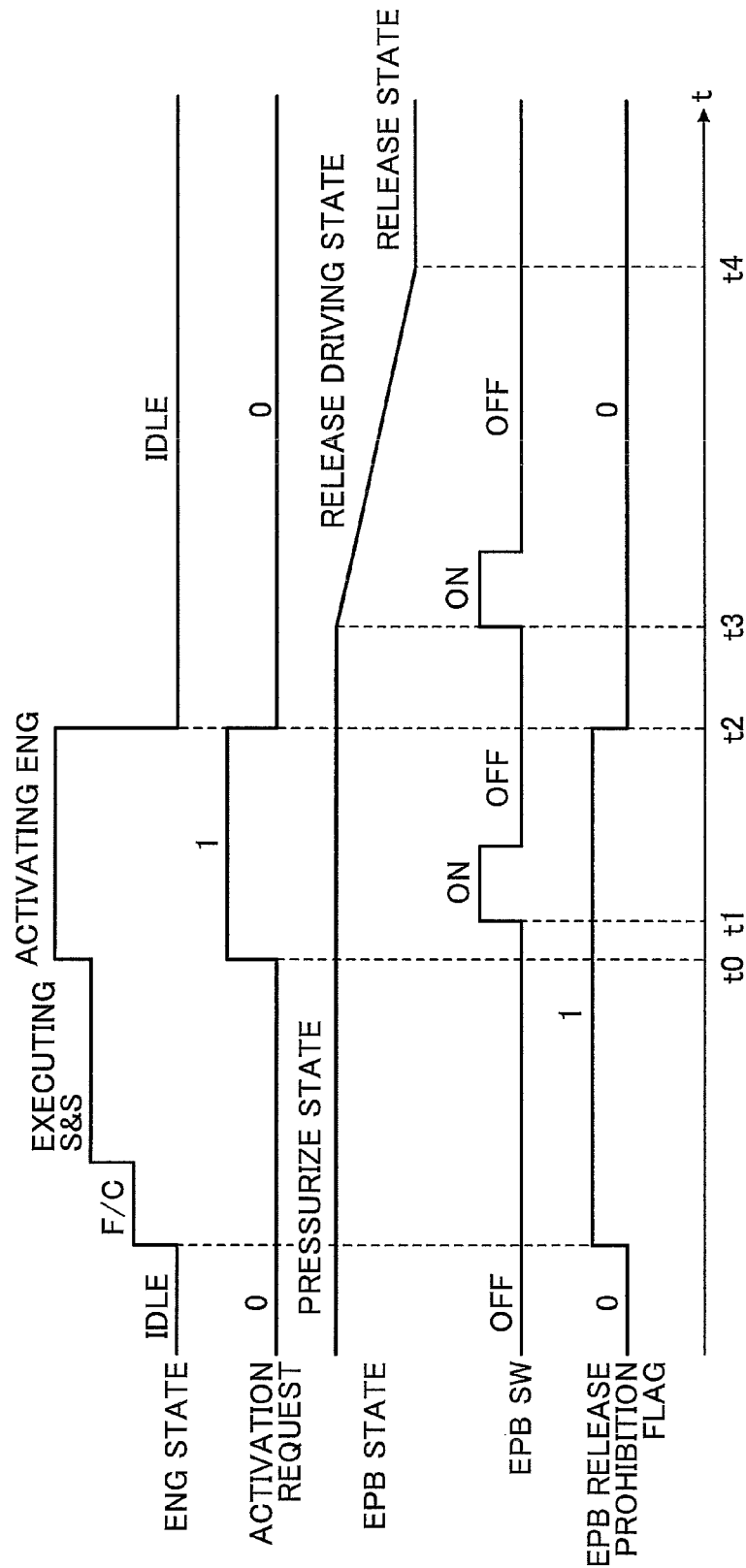

VEHICLE ENGINE ACTIVATION CONTROL SYSTEM

BACKGROUND OF THE INVENTION

1. Field of the Invention

The present invention is related to a vehicle engine activation control system.

2. Description of the Related Art

An electric parking brake system that causes a parking brake to automatically operate by an electric motor, and a parking brake control device applied to a vehicle provided with an idle stop system that automatically stops the engine, are known (see, for example, Patent Document 1). This parking brake control device includes a parking brake control unit that causes a parking brake to automatically operate in a direction of applying a braking force according to the implementation of idle stopping, and a parking brake release unit that causes the parking brake to automatically operate in a direction of releasing the braking force when there is a request to release the idle stopping and automatically reactivate the engine. The parking brake release unit allows the automatic release, on condition that the start driving force of the vehicle is greater than or equal to a predetermined value.

[Patent Document 1] Japanese Laid-open Patent Publication No. 2012-035773

However, in the configuration described in Patent Document 1, the electric parking brake automatically operates in conjunction with the control state of idle stopping, and therefore the operation of the electric parking brake is implemented with no relation to the driver's intention, which is a problem in that the driver's intention cannot be reflected.

Meanwhile, if the electric parking brake control device is configured to operate according to input from the driver in order to reflect the driver's intention, the reactivation of the engine and the operation of the electric parking brake device are performed at the same time, and the load on the battery may become high. This is because the starter is driven when the engine is reactivated, and the electric motor is driven when the electric parking brake device operates, and the power of the battery is used for driving both of these elements.

SUMMARY OF THE INVENTION

According to one aspect of the present invention, a vehicle engine activation control system includes a starter connected to a battery; an idle stop control unit configured to automatically stop an engine and automatically reactivate the engine by the starter; an input unit configured to generate an operation request in response to input from a driver; an electric parking brake device including an electric motor connected to the battery, wherein the electric motor starts driving in response to the operation request; and a mediating unit configured to prohibit the reactivation of the engine by the idle stop control unit, when the electric motor is in a driving state in response to a predetermined operation request.

BRIEF DESCRIPTION OF THE DRAWINGS

Other objects, features and advantages of the present invention will become more apparent from the following detailed description when read in conjunction with the accompanying drawings, in which:

FIG. 10 is a timing chart of an example of changes in time series of the respective states when reactivating an engine; and FIG. 11 is a timing chart of another example of changes in time series of the respective states when reactivating an engine.

DETAILED DESCRIPTION OF THE EMBODIMENTS

In the following, with reference to drawings, a description is given of the best mode for carrying out the present invention.

Figure 1A:
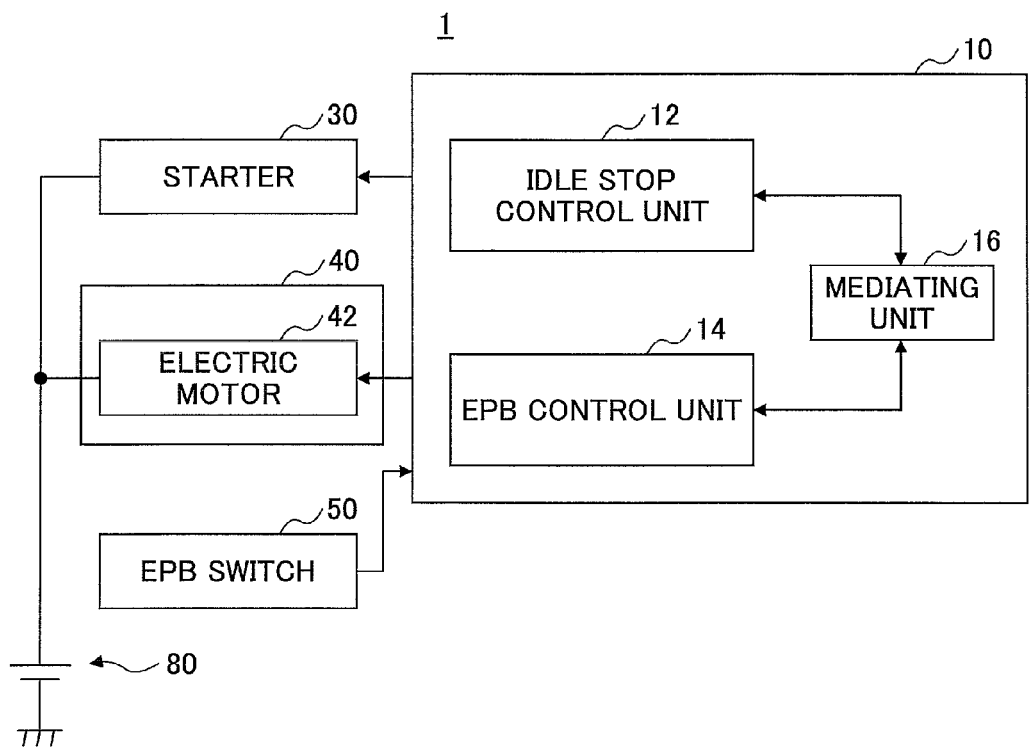
FIGS. 1A and 1B illustrate a vehicle engine activation control system according to an embodiment of the present invention.
Figure 1B:
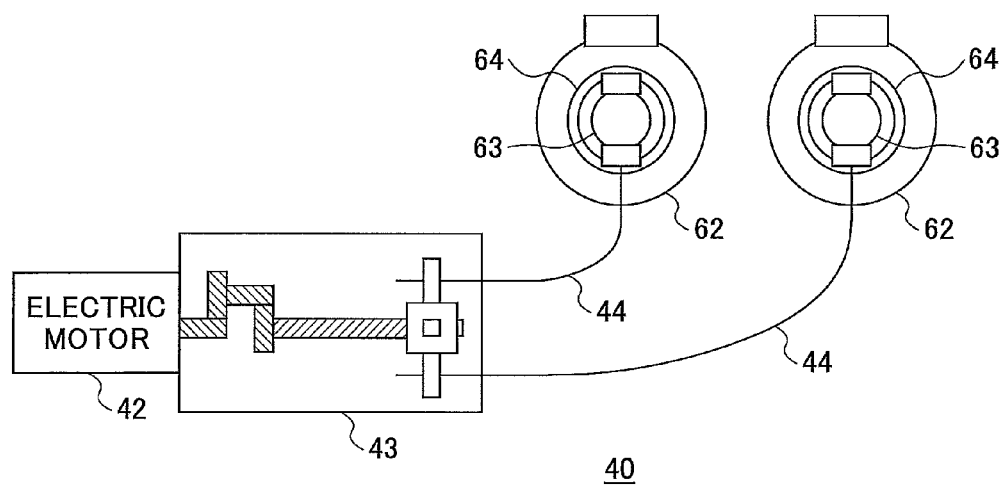

FIGS. 1A and 1B illustrate a vehicle engine activation control system 1 according to an embodiment of the present invention. FIG. 1A is a configuration diagram of the vehicle engine activation control system 1. FIG. 1B schematically illustrates an example of an electric parking brake device 40.

As illustrated in FIG. 1A, the vehicle engine activation control system 1 includes a control device 10, a starter 30, the electric parking brake device 40, and an EPB (Electric Parking Brake) switch 50.

The control device 10 is formed by a computer such as an ECU (Electronic Control Unit). The control device 10 may be realized by a plurality of computers. To the control device 10, the starter 30, an electric motor 42, and the EPB switch 50 are connected.

The control device 10 includes an idle stop control unit 12, an EPB control unit 14, and a mediating unit 16.

The idle stop control unit 12 executes idle stop control. The idle stop control is also referred to as S&S (Start & Stop). The idle stop control unit 12 causes an engine (not illustrated) to automatically stop, when a stop condition is established while the engine is operating. For example, when all of the following conditions (1) through (3) are satisfied, the stop condition is established.

Condition (1): The speed of the own vehicle is less than or equal to a predetermined speed.

Condition (2): The accelerator pedal is not stepped on.

Condition (3): The negative pressure inside the brake booster is closer to vacuum than a predetermined threshold.

Note that the conditions (1) through (3) are examples, and may be changed according to need. Furthermore, as an AND condition with respect to the conditions (1) through (3), conditions relevant to the state of operating the brakes by the driver, the state of air-conditioning, and the state of charging the battery (SOC: State Of Charge) may be added. In the following, the operation of automatically causing the engine to stop by the idle stop control unit 12 is referred to as "engine automatic stop". By stopping the supply of fuel to the engine (fuel cut), the idle stop control unit 12 starts the engine automatic stop. When the idle stop control unit 12 has started the engine automatic stop according to the establishment of the stop condition, the idle stop control unit 12 sets an executing S&S flag to "1". Note that while the executing S&S flag is "0", the idle stop control unit 12 may periodically determine whether the stop condition is established.

When a reactivation condition is established during the engine automatic stop or after the engine automatic stop has been completed, the idle stop control unit 12 drives the starter 30 and causes the engine to be automatically reactivated. During engine automatic stop means the period from when the engine automatic stop is started to when the engine speed becomes zero. However, even when the reactivation condition is established, the idle stop control unit 12 may be prohibited from reactivating the engine, by the mediating unit 16. This is described below.

The EPB control unit 14 controls the electric motor 42. The EPB control unit 14 drives the electric motor 42 in response to a pressurizing request or a release request generated according to the operation state of the EPB switch 50. The pressurizing request is a signal requesting to apply a braking force on the wheel by the electric parking brake device 40, and the release request is a signal requesting to release the braking force applied on the wheel by the electric parking brake device 40.

An operation example of the mediating unit 16 is described below.

The starter 30 is connected to a battery 80. The starter 30 is driven by the power of the battery 80. The starter 30 is controlled by the idle stop control unit 12. The starter 30 is driven when the engine is activated (including the time of reactivation).

As illustrated in FIG. 1B, the electric parking brake device 40 includes the electric motor 42, a gear mechanism 43, and a cable 44. Furthermore, the electric parking brake device 40 includes the EPB control unit 14.

The electric motor 42 is provided on, for example, the rear wheel, together with the gear mechanism 43, the cable 44, etc. As illustrated in FIG. 1A, the electric motor 42 is connected to the battery 80. The electric motor 42 is driven by the power of the battery 80. The driving force of the electric motor 42 is transmitted to a brake shoe 63 used for parking, via the gear mechanism 43 and the cable 44. Accordingly, the brake shoe 63 is pressed against a brake drum 64, and a braking force is applied by the frictional force (parking braking force) between the brake shoe 63 and the brake drum 64.

The electric motor 42 is controlled by the EPB control unit 14. The EPB control unit 14 drives the electric motor 42 in a direction of applying a braking force to the wheel, in response to a pressurizing request. In the following, the operation of driving the electric motor 42 in a direction of applying a braking force to the wheel is also referred to as "pressurize driving". For example, the EPB control unit 14 pulls the cable 44 by normally rotating the electric motor 42, locks the wheel, and after locking the wheel, the EPB control unit 14 stops normally rotating the electric motor 42 and maintains the locked state by a maintaining device of the gear mechanism 43. The EPB control unit 14 drives the electric motor 42 in a direction of releasing the braking force applied to the wheel, in response to a release request. In the following, the operation of driving the electric motor 42 in a direction of releasing the braking force applied to the wheel is also referred to as "release driving". For example, the EPB control unit 14 operates the gear mechanism 43 such that the tension of the cable 44 is loosened by reverse rotating the electric motor 42.

The EPB switch 50 is provided in the vehicle interior. The EPB switch 50 generates a pressurizing request or a release request in response to input from the driver. The EPB switch 50 may have a form of, for example, a momentary switch. In this case, an electric signal that is generated when the EPB switch 50 is pressed when the electric parking brake device 40 is in a release state becomes a pressurizing request, and an electric signal that is generated when the EPB switch 50 is pressed when the electric parking brake device 40 is in a pressurize state becomes a release request.

Next, with reference to FIGS. 2 through 6, a description is given of an operation example (first embodiment) of the vehicle engine activation control system 1. In the first embodiment, in principle, it is assumed that the mediating unit 16 does not restrict the operation of the EPB control unit 14 at all. That is, it is assumed that when the pressurizing request is generated, the EPB control unit 14 immediately causes the electric motor 42 to perform pressurize driving, and when a release request is generated, the EPB control unit 14 immediately causes the electric motor 42 to perform release driving. However, as described below, when a pressurizing request or a release request is generated while the engine is being reactivated, the EPB control unit 14 may wait until the discontinuation of the reactivation of the engine is completed (see step S314 of FIG. 3) (that is, until the driving of the starter 30 has completely stopped), and then cause the electric motor 42 to start driving.

Figure 2:
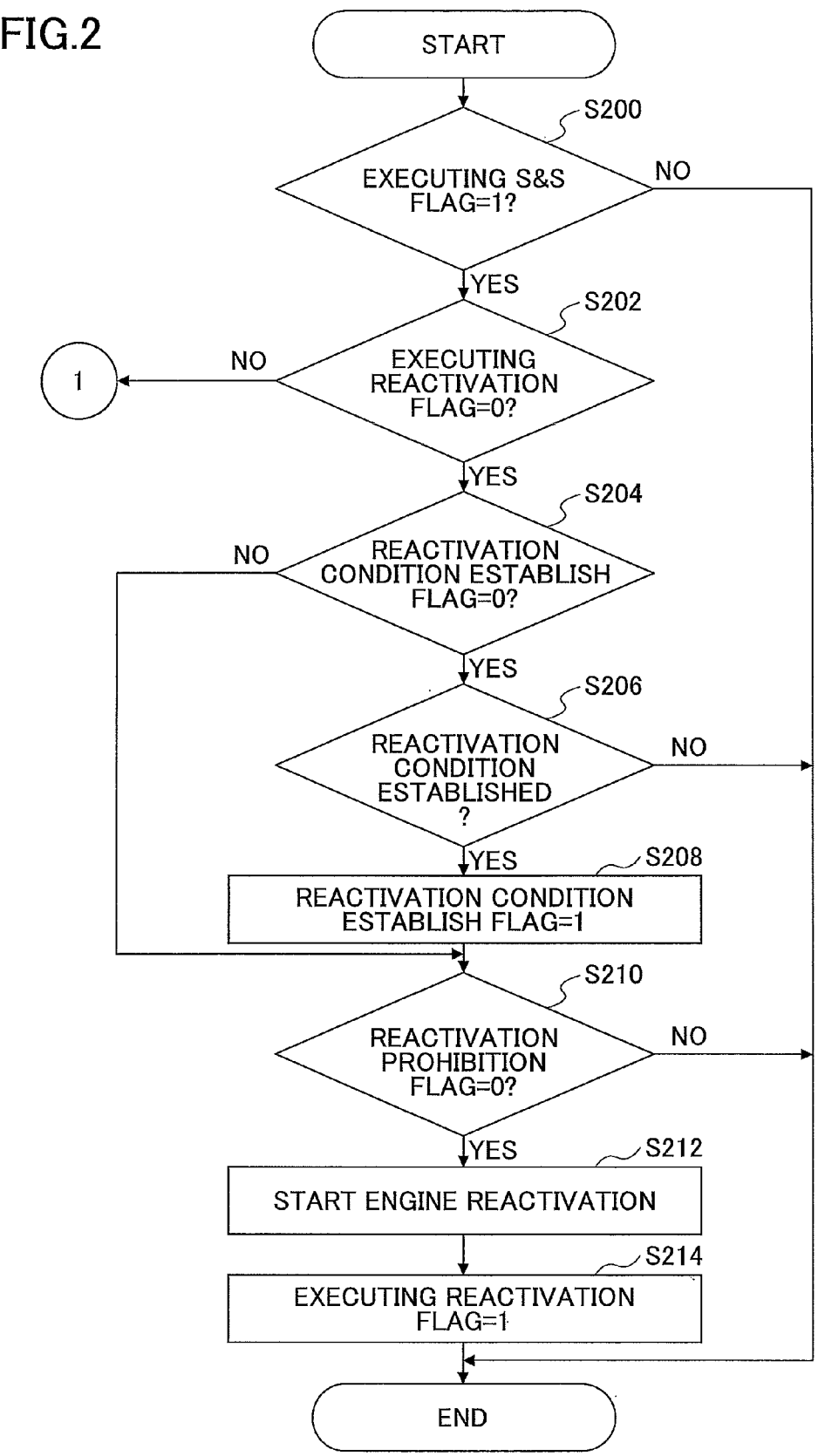
FIG. 2 is a flowchart of a part of a process executed by an idle stop control unit (part 1)

FIG. 2 is a flowchart of a part (a part relevant to the reactivation of the engine) of a process executed by the idle stop control unit 12. The process of FIG. 2 is executed at predetermined cycles.

In step S200, the idle stop control unit 12 determines whether the executing S&S flag is "1". The executing S&S flag is set to "1" when the automatic stopping of the engine is started according to the establishment of the stop condition as described above. When the executing S&S flag is "1", the process proceeds to step S202, and otherwise, the process of the present cycle is ended.

In step S202, the idle stop control unit 12 determines whether an executing reactivation flag is "0". The initial value of the executing reactivation flag is "0". When the executing reactivation flag is "0", the process proceeds to step S204, and otherwise, the process proceeds to step S302 of FIG. 3.

In step S204, the idle stop control unit 12 determines whether the reactivation condition establish flag is "0". The initial value of the reactivation condition establish flag is "0". When the reactivation condition establish flag is "0", the process proceeds to step S206, and otherwise, the process proceeds to step S210.

In step S206, the idle stop control unit 12 determines whether the reactivation condition has been established. For example, the reactivation condition is established when any one of the following conditions (4) through (6) is no longer satisfied.

Condition (4): The speed of the own vehicle is less than or equal to a predetermined speed.

Condition (5): The accelerator pedal is not stepped on.

Condition (6): The negative pressure inside the brake booster is closer to vacuum than a predetermined threshold.

Note that in the case of a manual transmission vehicle, the reactivation condition may be satisfied in cases other than when the shift range is N (neutral).

When the reactivation condition is established, the process proceeds to step S208, and otherwise, the process of the present cycle is ended.

In step S208, the idle stop control unit 12 sets the reactivation condition establish flag to "1". The reactivation condition establish flag being "1" indicates a state where a request to activate the engine has been generated.

In step S210, the idle stop control unit 12 determines whether a reactivation prohibition flag is "0". The initial value of the reactivation prohibition flag is "0". The state of the reactivation prohibition flag may be changed by the mediating unit 16 as described below with reference to FIG. 4. When the reactivation prohibition flag is "0", the process proceeds to step S212, and otherwise, the process of the present cycle is ended.

In step S212, the idle stop control unit 12 starts the reactivation of the engine. Specifically, the idle stop control unit 12 starts driving the starter 30. Note that the idle stop control unit 12 may determine whether the reactivation of the engine is possible, before starting the reactivation of the engine. For example, in the case of a manual transmission vehicle, when the clutch pedal is not stepped on, it may be determined that the reactivation of the engine is not possible. When the reactivation of the engine is not possible, an alert warning, etc., may be output. Furthermore, when the determination result of step S210 is "YES", the idle stop control unit 12 may start driving the starter 30, after a predetermined time (for example, 100 ms).

In step S214, the idle stop control unit 12 sets the executing reactivation flag to "1".

Figure 3:
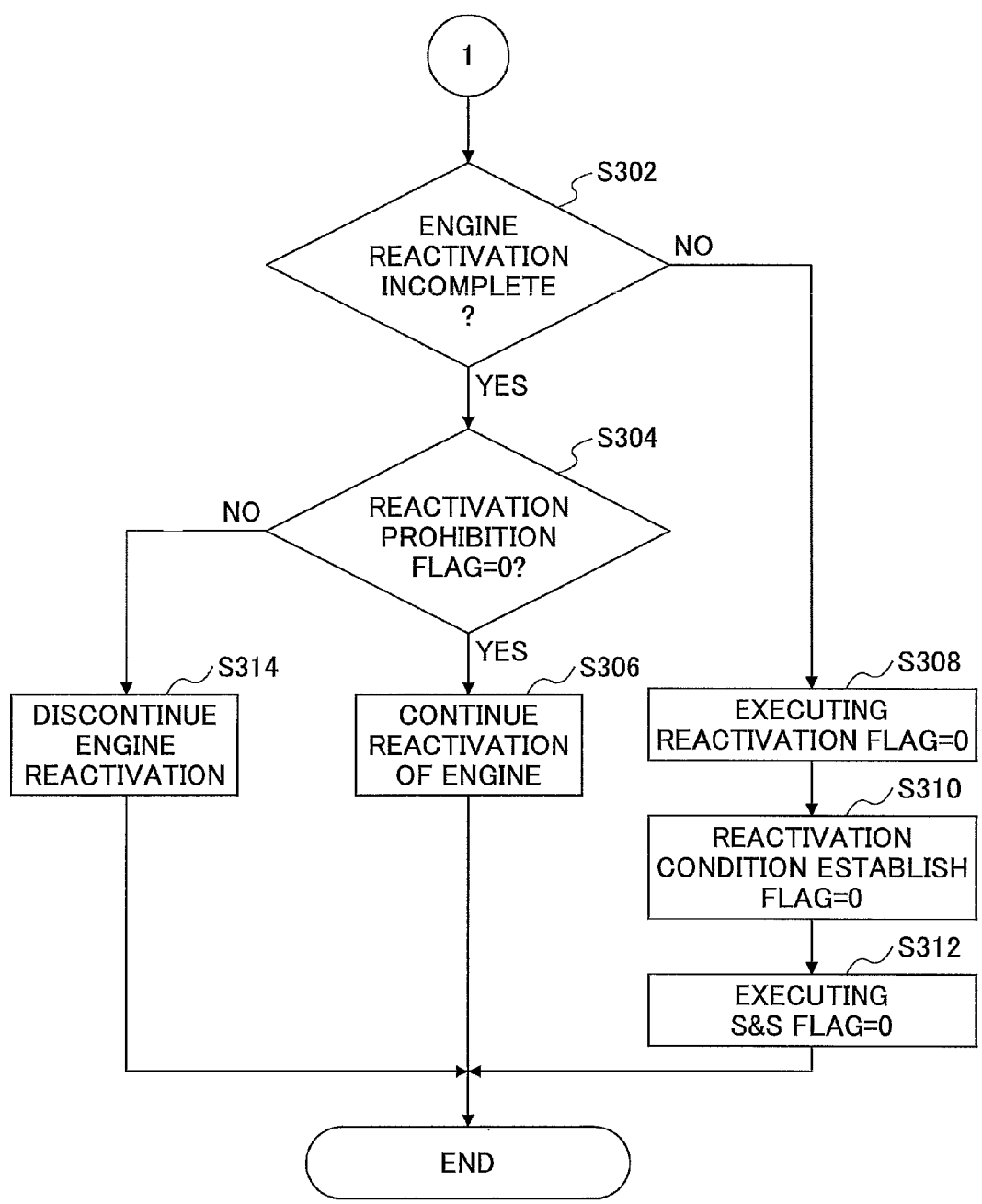
FIG. 3 is a flowchart of a part of a process executed by the idle stop control unit (part 2)

FIG. 3 is a flowchart of a part (a part relevant to the reactivation) of a process executed by the idle stop control unit 12. The process of FIG. 3 is executed when the determination result of step S202 of FIG. 2 is "NO".

In step S302, the idle stop control unit 12 determines whether the reactivation of the engine has not yet ended. The idle stop control unit 12 determines that the reactivation of the engine has not yet ended, when the engine speed is less than a predetermined idle speed. Alternatively, the idle stop control unit 12 may determine that the reactivation of the engine has not yet ended, when a predetermined time has not passed after the completion of the operation of the starter 30. When the reactivation of the engine has not yet ended, the process proceeds to step S304, and otherwise (that is, when the reactivation of the engine is completed), the process proceeds to step S308.

In step S304, the idle stop control unit 12 determines that the reactivation prohibition flag is "0". When the reactivation prohibition flag is "0", the process proceeds to step S306, and otherwise, the process proceeds to step S314.

In step S306, the idle stop control unit 12 continues the reactivation of the engine. For example, the idle stop control unit 12 continues the driving of the starter 30. Note that when the driving is resumed after the discontinuing (see step S314), the idle stop control unit 12 may start (resume) the driving of the starter 30, after a predetermined time (for example, 100 ms), similar to step S212.

In step S308, the idle stop control unit 12 sets the executing reactivation flag to "0".

In step S310, the idle stop control unit 12 sets the reactivation condition establish flag to "0".

In step S312, the idle stop control unit 12 sets the executing S&S flag to "0".

In step S314, the idle stop control unit 12 discontinues the reactivation of the engine. For example, the idle stop control unit 12 discontinues the driving of the starter 30.

According to the processes of FIGS. 2 and 3, even when the idle stop control unit 12 determines that the reactivation condition is established, the mediating unit 16 may prohibit the reactivation of the engine. Specifically, even when the determination result of step S206 is "YES", if the reactivation prohibition flag is "1", the determination result of step S210 becomes "NO", and the process of step S212 is not executed. That is, in this case, the reactivation of the engine is prohibited.

Furthermore, according to the processes of FIGS. 2 and 3, even when the idle stop control unit 12 temporarily starts the reactivation of the engine in step S212, subsequently, if the reactivation prohibition flag becomes "1", the determination result of step S304 becomes "NO", and the reactivation of the engine is discontinued. In this case, subsequently, when the reactivation prohibition flag becomes "0", the idle stop control unit 12 resumes the reactivation of the engine (step S306).

Figure 4:
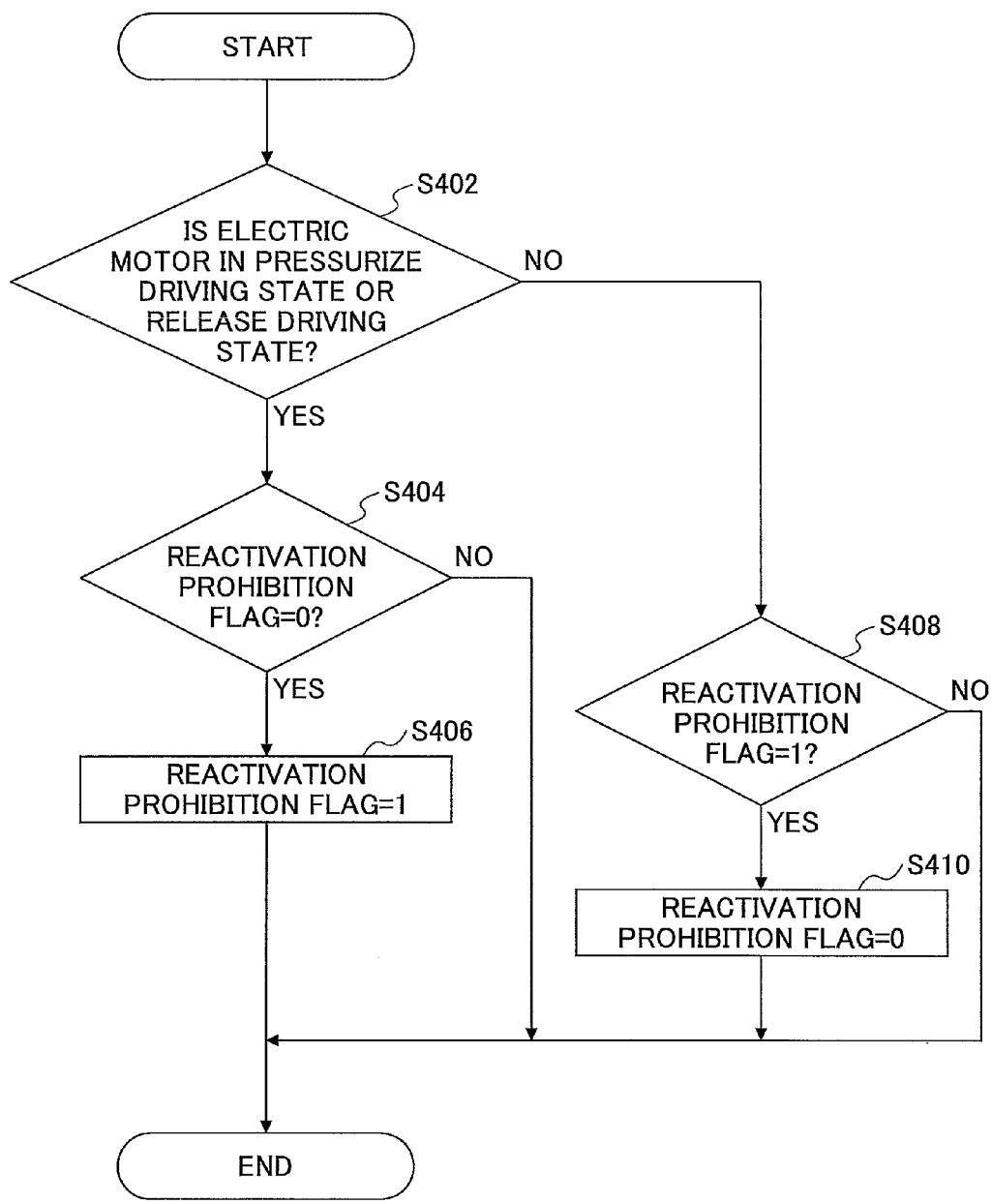
FIG. 4 is a flowchart of a process executed by a mediating unit according to a first embodiment.

FIG. 4 is a flowchart of a process executed by the mediating unit 16. The process of FIG. 4 is executed at predetermined cycles.

In step S402, the mediating unit 16 determines whether the electric motor 42 is in a driving state. In the first embodiment, the mediating unit 16 determines that the electric motor 42 is in a driving state, both in the case where the electric motor 42 is in a driving state in response to a pressurizing request, and in the case where the electric motor 42 is in a driving state in response to a release request. The mediating unit 16 can determine whether the electric motor 42 is in a driving state, based on control information from the EPB control unit 14. Alternatively, the mediating unit 16 can determine whether the electric motor 42 is in a driving state, based on whether a pressurizing request and a release request are generated. For example, the mediating unit 16 may determine that the electric motor 42 is in a driving state, within a predetermined time from when the pressurizing request and the release request are generated. The predetermined time corresponds to the time taken from starting driving the electric motor 42 to completing the driving; the predetermined time may be derived based on tests, etc., in advance. Alternatively, the mediating unit 16 may determine whether the electric motor 42 is in a driving state, based on a detection value of a current flowing through the electric motor 42. When the electric motor 42 is in a driving state, the process proceeds to step S404, and otherwise, the process proceeds to step S408.

In step S404, the mediating unit 16 determines whether the reactivation prohibition flag is "0". When the reactivation prohibition flag is "0", the process proceeds to step S406, and otherwise, the process of the present cycle is ended.

In step S406, the mediating unit 16 sets the reactivation prohibition flag to "1".

In step S408, the mediating unit 16 determines whether the reactivation prohibition flag to "1". When the reactivation prohibition flag is "1", the process proceeds to step S410, and otherwise, the process of the present cycle is ended.

In step S410, the mediating unit 16 sets the reactivation prohibition flag to "0".

According to the process of FIG. 4, the mediating unit 16 is able to set and maintain the reactivation prohibition flag to "1", when the electric motor 42 is in a driving state. When the reactivation prohibition flag is "1", as described above, the reactivation of the engine by the idle stop control unit 12 is prohibited or discontinued (see "NO" in step S210 of FIG. 2, step S314 of FIG. 3). As described above, according to the processes illustrated in FIGS. 2 through 4, when the electric motor 42 is in a driving state, it is possible to prohibit the reactivation of the engine by the idle stop control unit 12. Furthermore, according to the processes illustrated in FIGS. 2 through 4, when the electric motor 42 is driven while the engine is being reactivated by the idle stop control unit 12, it is possible to discontinue the reactivation of the engine.

Figure 5:
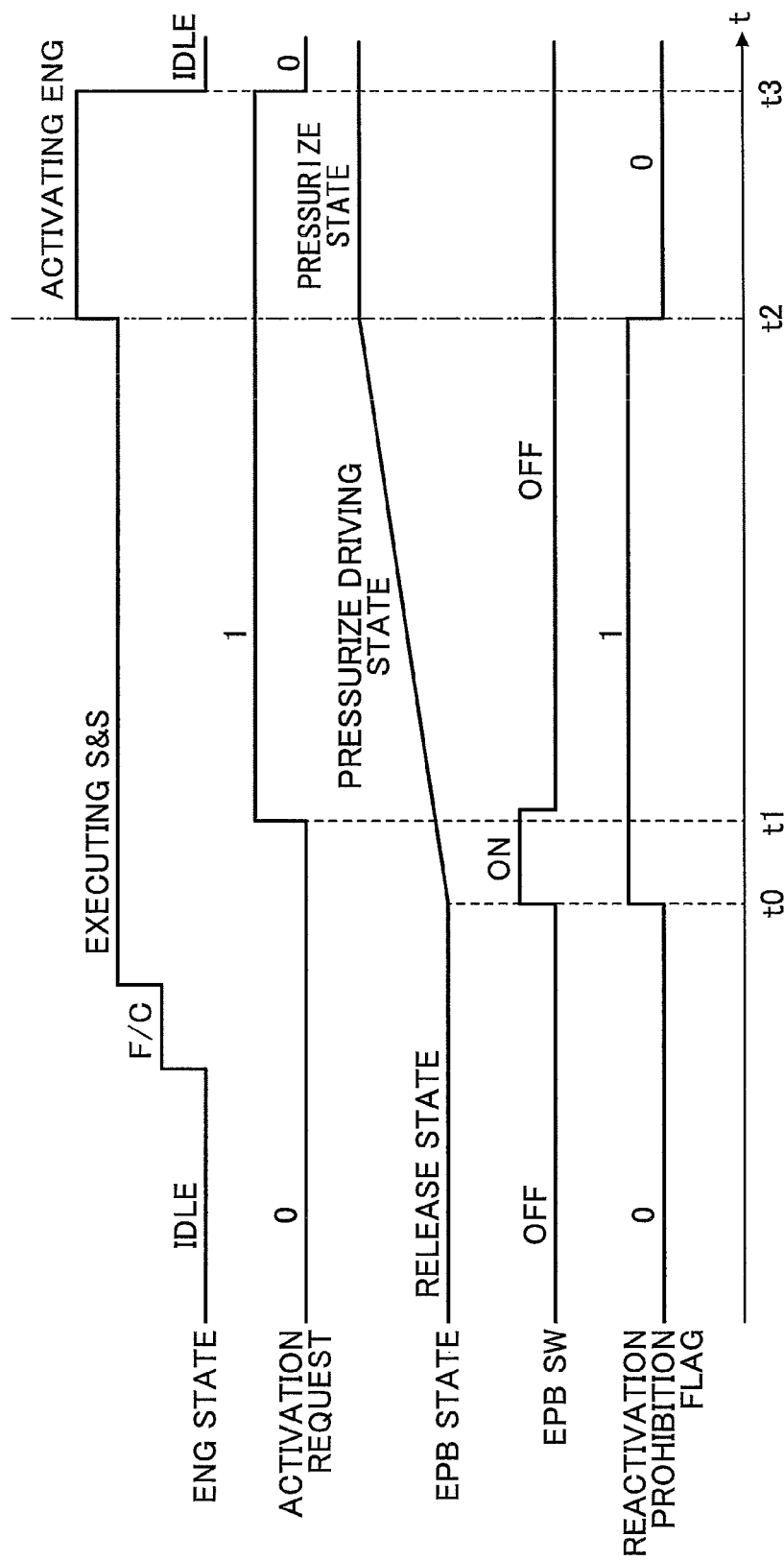
FIG. 5 is a timing chart of an example of changes in time series of the respective states when reactivating an engine.

FIG. 5 is a timing chart of an example of changes in time series of the respective states when reactivating an engine. The changes in time series illustrated in FIG. 5 are realized by the processes illustrated in FIGS. 2 through 4. In FIG. 5, the state of the engine (ENG state), the state of the reactivation condition establish flag (activation request), the state of the electric motor 42 (EPB state), the state of the EPB switch 50 (EPB SW), and the state of the reactivation prohibition flag, are illustrated in the stated order from the top. As the state of the engine, an idle state is expressed by "idle", a fuel cut state is expressed by "F/C", a state before reactivation after completing the engine automatic stop is expressed by "executing S&S", and an engine reactivation state is expressed by "reactivating ENG". Furthermore, as the state of the electric motor 42, the driving state according to a pressurizing request (pressurize driving state) is expressed by "pressurize driving state", and the state where driving according to a pressurizing request has ended is expressed by "pressurize state". The "pressurize state" is realized after the pressurize driving is completed, and corresponds to a state where a braking force is applied by the electric parking brake device 40. The "release state" corresponds to a state where a braking force is not applied by the electric parking brake device 40. The "pressurize state" and the release state" are common in that the electric motor 42 is not driven (not energized).

In the example of FIG. 5, after the completion of the engine automatic stop, at the time t0, a pressurizing request is generated as the driver operates the EPB switch 50, and accordingly, the electric motor 42 is caused to perform pressurize driving. Accordingly, the reactivation prohibition flag is set to "1". In the example of FIG. 5, in this pressurize driving state, at the time t1, the reactivation condition is established ("YES" in step S206). However, because the reactivation prohibition flag is "1", the reactivation of the engine is not started ("NO" in step S210). This prohibition state is continued until the time t2 at which the pressurize driving state ends and the reactivation prohibition flag becomes "0". At the time t2, the reactivation prohibition flag becomes "0", and the reactivation of the engine is started (step S212). In the example of FIG. 5, the reactivation prohibition flag remains as "0" while reactivating the engine, and therefore the reactivation of the engine is completed at the time t3 without being discontinued ("NO" in step S302).

Figure 6:
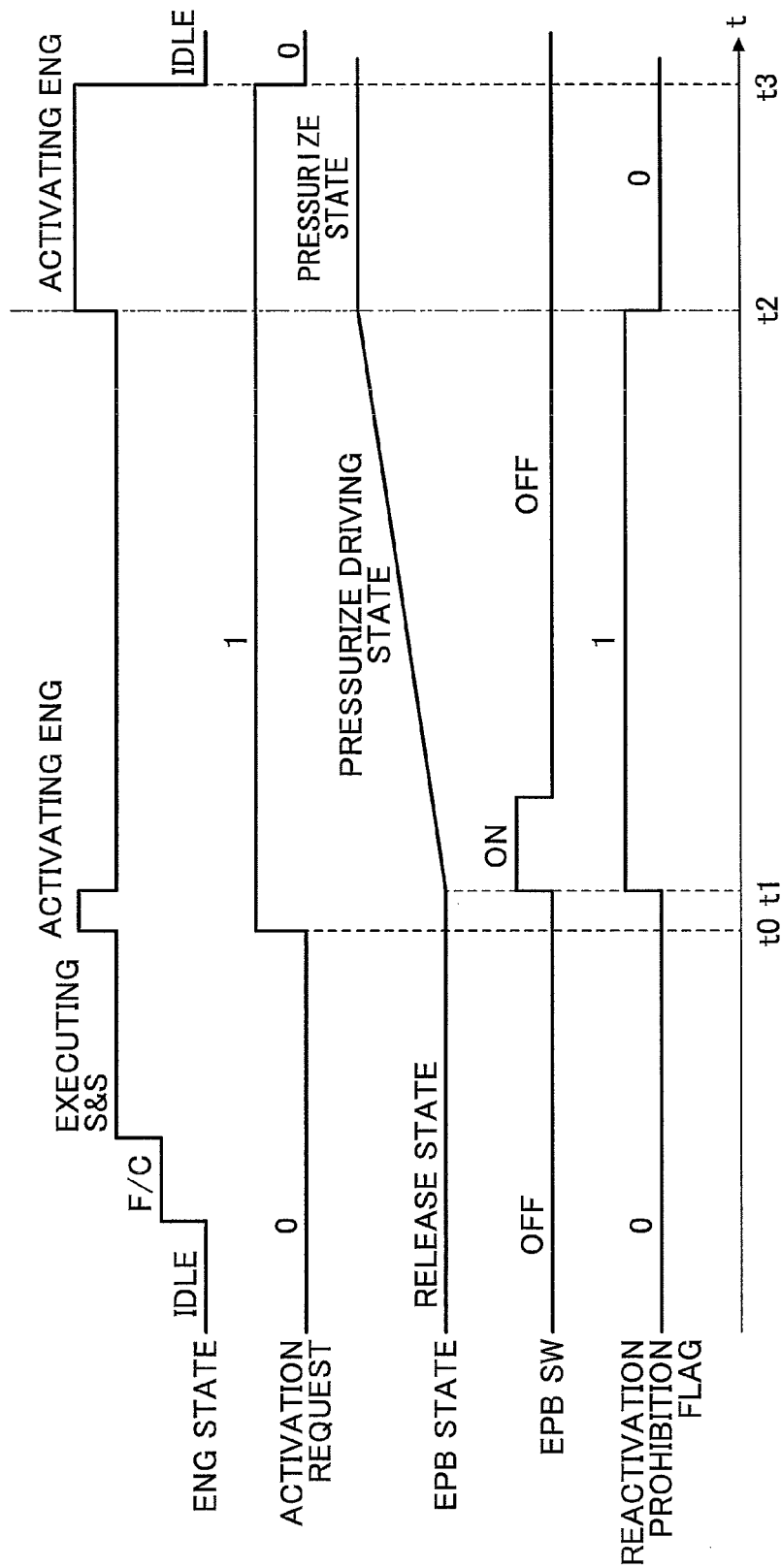
FIG. 6 is a timing chart of another example of changes in time series of the respective states when reactivating an engine.

FIG. 6 is a timing chart of another example of changes in time series of the respective states when reactivating an engine. The changes in time series illustrated in FIG. 6 are realized by the processes illustrated in FIGS. 2 through 4. The same expressions as those of FIG. 5 are used.

In the example of FIG. 6, after the completion of the engine automatic stop, at the time t0, the reactivation condition is established ("YES" in step S206). At this time, the reactivation prohibition flag is "0" ("YES" in step S210), and therefore the reactivation of the engine is started (step S212). Subsequently, before the completion of the reactivation of the engine (during reactivation) at the time t1, a pressurizing request is generated as the driver operates the EPB switch 50. Accordingly, the reactivation prohibition flag is set to "1". As a result, the reactivation of the engine is discontinued (step S314). Furthermore, the electric motor 42 is caused to perform pressurize driving in response to a pressurizing request at the time t1. At the time t2, when the pressurize driving state has ended, the reactivation prohibition flag becomes "0", and the reactivation of the engine is resumed (step S306). In the example of FIG. 6, the reactivation prohibition flag remains as "0" while reactivating the engine from the time t2, and therefore the reactivation of the engine is completed at the time t3 without being discontinued ("NO" in step S302).

Note that the examples of FIGS. 5 and 6 are relevant to pressurize driving; however, the same is applicable to release driving. This is because, according to the process of FIG. 4, as described above, the mediating unit 16 sets and maintains the reactivation prohibition flag at "1", in both the case where the electric motor 42 is in a driving state in response to a pressurizing request (pressurize driving state), and in the case where the electric motor 42 is in a driving state in response to a release request (release driving state).

According to the first embodiment, when the electric motor 42 is in a driving state, it is possible to prohibit the reactivation of the engine by the idle stop control unit 12. Furthermore, when driving the electric motor 42 during the reactivation of the engine by the idle stop control unit 12, it is possible to discontinue the reactivation of the engine. Therefore, it is possible to prevent a situation where both the driving state of the electric motor 42 and the driving state of the starter 30 for the reactivation of the engine by the idle stop control unit 12, are realized at the same time. Accordingly, the load on the battery 80 can be reduced, compared to a configuration in which the driving state of the electric motor 42 and the driving state of the starter 30 may be realized at the same time when reactivating the engine. As a result, it is possible to reduce the inconvenience that arises when the driving state of the electric motor 42 and the driving state of the starter 30 are realized at the same time; typically, the inconvenience in which the driving of the electric motor 42 and/or the driving of the starter 30 cannot be implemented in a desired mode due to a drop in the voltage of the battery 80.

Furthermore, in the first embodiment, as described above, the electric parking brake device 40 is operated in response to input from the driver via the EPB switch 50. That is, the EPB control unit 14 causes the electric motor 42 to perform pressurize driving in response to a pressurizing request, and causes the electric motor 42 to perform release driving in response to a release request. Therefore, according to the first embodiment, the electric parking brake device 40 can be configured to operate in response to input from the driver, and therefore it is possible to realize a drive mode in which the driver's intention is reflected.

Next, with reference to FIGS. 7 through 10, a description is given of another operation example (second embodiment) of the vehicle engine activation control system 1. In the second embodiment, it is assumed that the mediating unit 16 restricts the operations of the EPB control unit 14 (see FIGS. 8 and 9). In the second embodiment, the EPB control unit 14 immediately causes the electric motor 42 to perform pressurize driving when a pressurizing request is generated; however, when a release request is generated, the EPB control unit 14 causes the electric motor 42 to perform release driving, on condition that the EPB release prohibition flag is "0" (see FIG. 8). However, as described above, when the pressurizing request is generated during the reactivation of the engine, the EPB control unit 14 waits until the discontinuing of the reactivation of the engine is completed, and then causes the electric motor 42 to perform pressurize driving (see step S314 of FIG. 3).

In the second embodiment, the processes of FIGS. 2 and 3 according to the first embodiment described above, are executed by the idle stop control unit 12 in the same manner. However, in the second embodiment, in step S206, the idle stop control unit 12 determines that the reactivation condition is established when any one of the following conditions (4) through (6) is not satisfied, or when the condition (7) is satisfied.

Condition (4): The speed of the own vehicle is less than or equal to a predetermined speed.
Condition (5): The accelerator pedal is not stepped on.
Condition (6): The negative pressure inside the brake booster is closer to vacuum than a predetermined threshold.
Condition (7): A release request is generated by operating the EPB switch 50.

Therefore, in the second embodiment, by the process of FIG. 2, when a release request is generated by operating the EPB switch 50, the determination result of step S206 becomes "YES", and reactivation of the engine is started.

Figure 7:
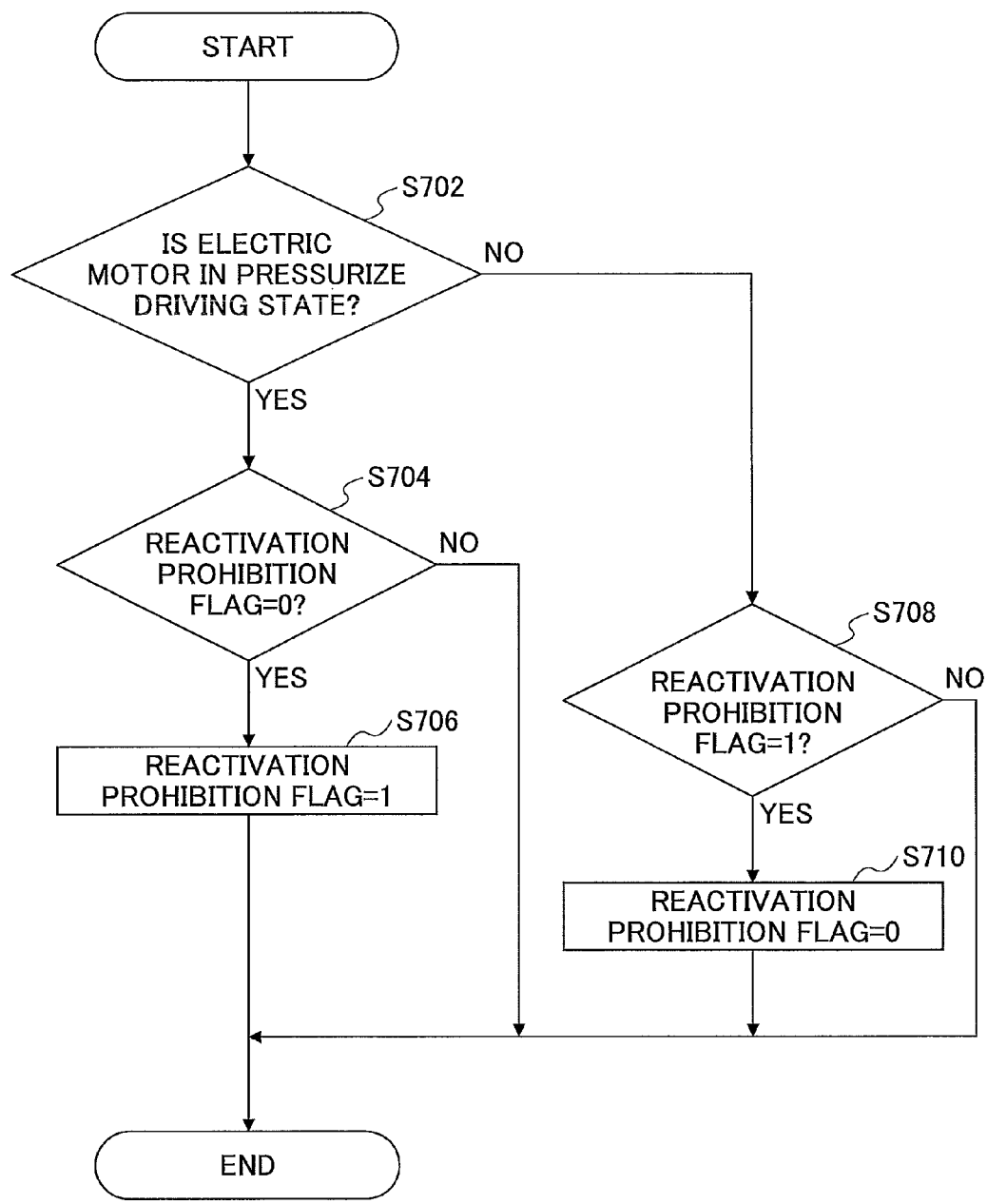
FIG. 7 is a flowchart of a part of a process executed by the mediating unit according to a second embodiment.

FIG. 7 is a flowchart of a part (a mediation process relevant to the reactivation of the engine by the idle stop control unit 12) of a process executed by the mediating unit 16. The process of FIG. 7 is executed at predetermined cycles.

In the process of FIG. 7, the processes of steps S704 through S710 are the same as the processes of steps S404 through S410 of FIG. 4.

In step S702, the mediating unit 16 determines whether the electric motor 42 is in a driving state. In the second embodiment, the mediating unit 16 determines that the electric motor 42 is in a driving state, only in the case of a pressurize driving state, between the case where the electric motor 42 is in a driving state in response to a pressurizing request (pressurize driving state), and in the case where the electric motor 42 is in a driving state in response to a release request (release driving state). The mediating unit 16 can determine whether the electric motor 42 is in a pressurize driving state, based on control information from the EPB control unit 14. Alternatively, the mediating unit 16 may determine whether the electric motor 42 is in a pressurize driving state, based on whether a pressurizing request is generated. For example, the mediating unit 16 may determine that the electric motor 42 is in a pressurize driving state, within a predetermined time from when the pressurizing request is generated. The predetermined time corresponds to the time taken from starting pressurize driving of the electric motor 42 to completing the pressurize driving; the predetermined time may be derived based on tests, etc., in advance. Alternatively, the mediating unit 16 may determine whether the electric motor 42 is in a pressurize driving state, based on a detection value of a current flowing through the electric motor 42. When the electric motor 42 is in a pressurize driving state, the process proceeds to step S704, and otherwise, the process proceeds to step S708.

According to the process of FIG. 7, the mediating unit 16 is able to set and maintain the reactivation prohibition flag to "1", when the electric motor 42 is in a pressurize driving state. When the reactivation prohibition flag is "1", as described above, the reactivation of the engine by the idle stop control unit 12 is prohibited or discontinued (see "NO" in step S210 of FIG. 2, step S314 of FIG. 3). As described above, according to the processes illustrated in FIGS. 2, 3, and 7, when the electric motor 42 is in a pressurize driving state, it is possible to prohibit the reactivation of the engine by the idle stop control unit 12. Furthermore, according to the processes illustrated in FIGS. 2, 3, and 7, when the electric motor 42 is caused to perform pressurize driving while the engine is being reactivated by the idle stop control unit 12, it is possible to discontinue the reactivation of the engine.

Figure 8:
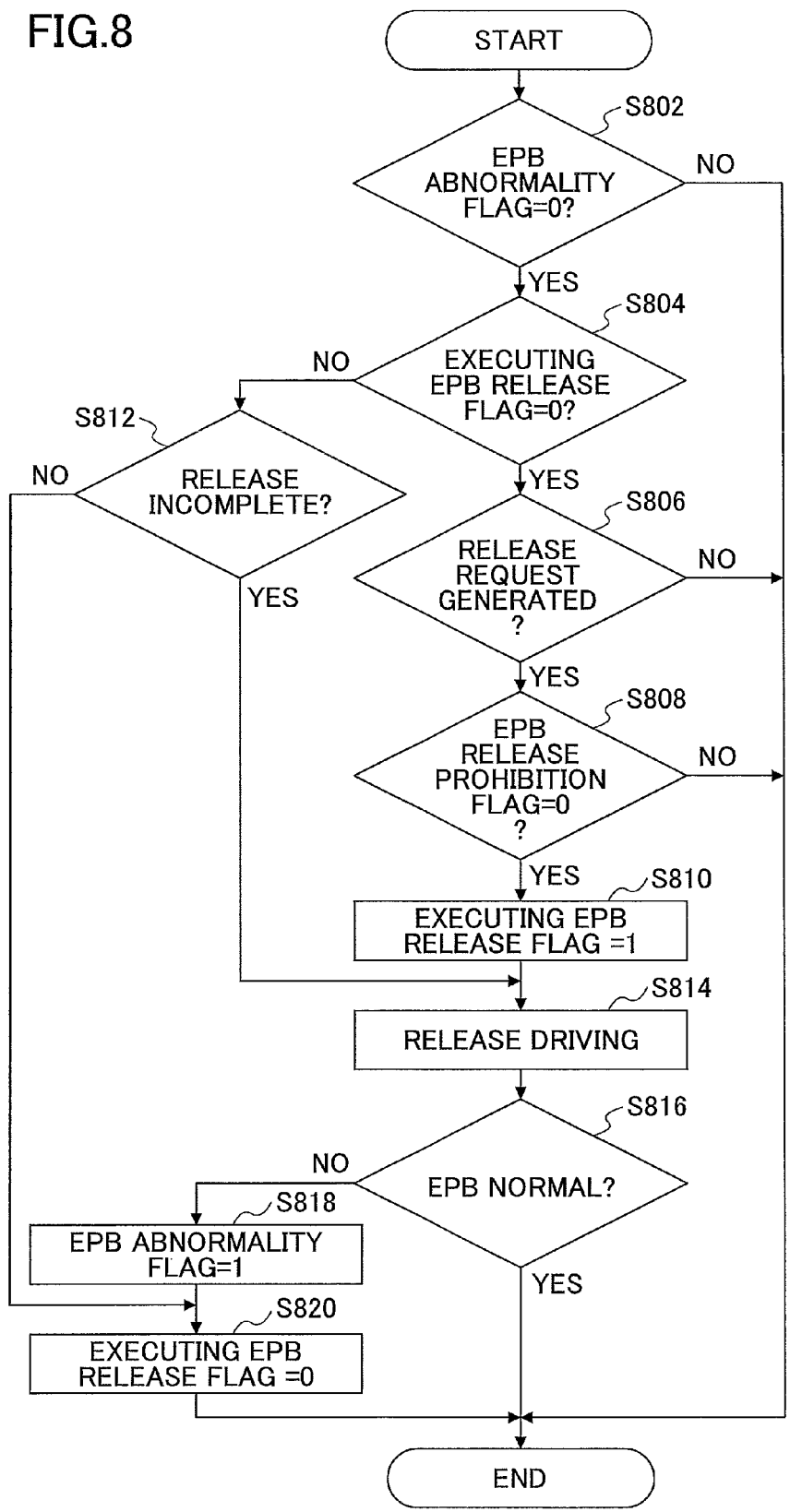
FIG. 8 is a flowchart of a part of a process executed by an EPB control unit.

FIG. 8 is a flowchart of a part (a part relevant to the release request) of a process executed by the EPB control unit 14. The process of FIG. 8 is executed at predetermined cycles.

In step S802, the EPB control unit 14 determines whether an EPB abnormality flag is "0". A state where the EPB abnormality flag is "1" indicates a state where an abnormality of the electric parking brake device 40 has been detected. The initial value of the EPB abnormality flag is "0". When the EPB abnormality flag is "0", the process proceeds to step S804, and otherwise, the process of the present cycle is ended.

In step S804, the EPB control unit 14 determines whether an executing EPB release flag is "0". The initial value of the executing EPB release flag is "0". When the executing EPB release flag is "0", the process proceeds to step S806, and otherwise, the process proceeds to step S812.

In step S806, the EPB control unit 14 determines whether a release request is generated. When a release request is generated, the process proceeds to step S808, and otherwise, the process of the present cycle is ended.

In step S808, the EPB control unit 14 determines whether the EPB release prohibition flag is "0". The initial value of the EPB release prohibition flag is "0". The state of the EPB release prohibition flag is changed by the mediating unit 16 as described below with reference to FIG. 9. When the EPB release prohibition flag is "0", the process proceeds to step S810, and otherwise, the process of the present cycle is ended.

In step S810, the EPB control unit 14 sets the executing EPB release flag to "1".

In step S812, the EPB control unit 14 determines whether the release driving is not yet completed. When the release driving is not yet completed, the process proceeds to step S814, and otherwise, the process proceeds to step S820.

In step S814, the EPB control unit 14 starts or continues the release driving. Note that when starting the release driving, when the determination result of step S808 is "YES", the EPB control unit 14 may start the release driving after a predetermined time has passed (for example, one process cycle).

In step S816, the EPB control unit 14 determines whether the electric parking brake device 40 is normal. The EPB control unit 14 may determine whether the electric parking brake device 40 is normal based on an operation state, etc., of the electric motor 42. When the electric parking brake device 40 is normal, the process of the present cycle is ended, and otherwise, the process proceeds to step S818.

In step S818, the EPB control unit 14 sets the EPB abnormality flag to "1". When the process of step S818 is ended, the process proceeds to step S820.

In step S820, the EPB control unit 14 sets the executing EPB release flag to "0".

According to the process of FIG. 8, even when a release request is generated, if the EPB release prohibition flag is "1", the EPB control unit 14 prohibits the release driving ("NO" in step S808).

Figure 9:
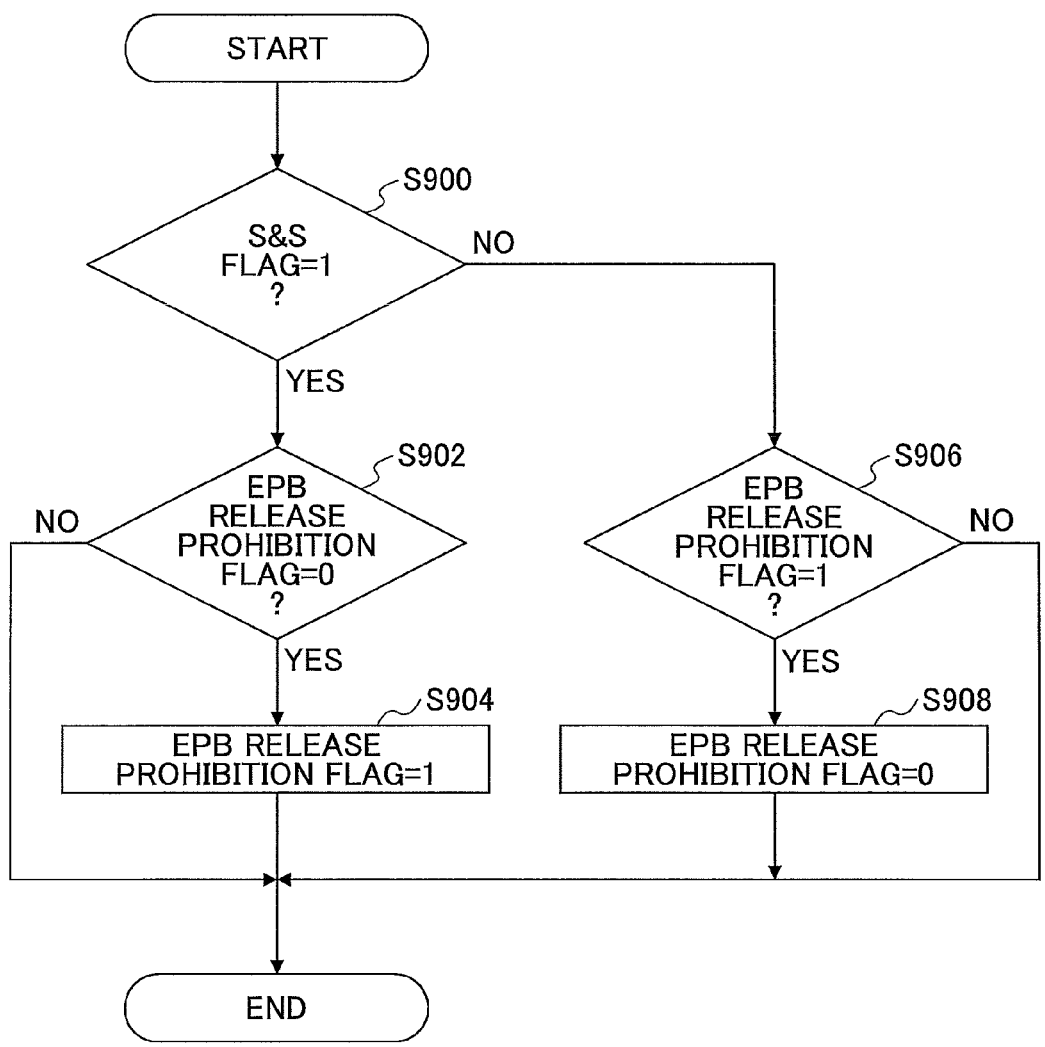
FIG. 9 is a flowchart of a part (a mediating process relevant to release driving by the EPB control unit) of a process executed by the mediating unit.

FIG. 9 is a flowchart of a part (a mediating process relevant to release driving by the EPB control unit 14) of a process executed by the mediating unit 16. The process of FIG. 9 is executed at predetermined cycles.

In step S900, the mediating unit 16 determines whether the executing S&S flag is "1". The executing S&S flag is set to "1" when the automatic stopping of the engine is started according to the establishment of the stop condition as described above. When the executing S&S flag is "1", the process proceeds to step S902, and otherwise, the process proceeds to step S906.

In step S902, the mediating unit 16 determines whether the EPB release prohibition flag is "0". When the EPB release prohibition flag is "0", the process proceeds to step S904, and otherwise, the process of the present cycle is ended.

In step S904, the mediating unit 16 sets the EPB release prohibition flag to "1".

In step S906, the mediating unit 16 determines whether the EPB release prohibition flag is "1". When the EPB release prohibition flag is "1", the process proceeds to step S908, and otherwise, the process of the present cycle is ended.

In step S908, the mediating unit 16 sets the EPB release prohibition flag to "0".

According to the process of FIG. 9, the mediating unit 16 is able to set and maintain the EPB release prohibition flag to "1", during a period from when the automatic stop of the engine is started by the idle stop control unit 12 to when the reactivation is completed (step S904). When the EPB release prohibition flag is "1", as described above, the release driving by the EPB control unit 14 is prohibited ("NO" in step S808). As described above, according to the process of FIG. 9, when the engine is reactivated in response to a release request, it is possible to prohibit the release driving of the electric motor 42 by the EPB control unit 14 in response to the release request. Furthermore, according to the process of FIG. 9, when the engine is reactivating, it is possible to prohibit the release driving of the electric motor 42 by the EPB control unit 14.

Note that in the process of FIG. 9, when the executing S&S flag is changed from "1" to "0" as the reactivation of the engine is completed, the mediating unit 16 changes the EPB release prohibition flag from "1" to "0"; however, the mediating unit 16 may change the EPB release prohibition flag from "1" to "0" when the driving of the starter 30 is completed. The driving state of the starter 30 may be determined based on information (flag) from the idle stop control unit 12.

FIG. 10 is a timing chart of an example of changes in time series of the respective states when reactivating an engine. The changes in time series illustrated in FIG. 10 are realized by the processes illustrated in FIGS. 2, 8, and 9. In FIG. 10, the state of the engine (ENG state), the state of the executing reactivation flag (activation request), the state of the electric motor 42 (EPB state), the state of the EPB switch 50 (EPB SW), and the state of the EPB release prohibition flag, are illustrated in the stated order from the top. The expressions are the same as those of FIG. 5. Note that the state of the electric motor 42 is expressed by "release driving state" which is the driving state (release driving state) according to the release request.

In the example of FIG. 10, after the completion of the engine automatic stop, at the time to, a release request is generated as the driver operates the EPB switch 50, and accordingly, a reactivation condition is established ("YES" in step S206). At this time, the reactivation prohibition flag (not illustrated) becomes "0" ("YES" in step S210), and the reactivation of the engine is started (step S212). At this time, the EPB release prohibition flag which has been set to "1" according to the engine automatic stop, remains as "1". Therefore, the release driving according to the release request generated at the time t0 is prohibited ("NO" in step S808). This prohibition state is continued until the time t1 at which the reactivation of the engine is completed and the EPB release prohibition flag becomes "0" (step S908). At the time t2 after the time t1, a release request is generated as the driver operates the EPB switch 50 again. At the time t2, the engine is in an operating state, and therefore the EPB release prohibition flag is not "1". Therefore, the electric motor 42 is caused to perform release driving in response to the release request generated at the time t2 (step S814). In the example of FIG. 10, the release driving state of the electric motor 42 is completed at the time t3 ("NO" in step S812).

FIG. 11 is a timing chart of another example of changes in time series of the respective states when reactivating an engine. The changes in time series illustrated in FIG. 11 are realized by the processes illustrated in FIGS. 2, 8, and 9. The expressions are the same as those of FIG. 5.

In the example of FIG. 11, after the completion of the engine automatic stop, at the time t0, a reactivation condition is established without being caused by a release request ("YES" in step S206). At this time, the reactivation prohibition flag is "0" ("YES" in step S210), and the reactivation of the engine is started (step S212). At the time t1, a release request is generated as the driver operates the EPB switch 50. At this time, the EPB release prohibition flag which has been set to "1" according to the engine automatic stop, remains as "1". Therefore, the release driving according to the release request generated at the time t1 is prohibited ("NO" in step S808). This prohibition state is continued until the time t2 at which the reactivation of the engine is completed and the EPB release prohibition flag becomes "0" (step S908). At the time t3 after the time t2, a release request is generated as the driver operates the EPB switch 50 again. At the time t3, the engine is in an operating state, and therefore the EPB release prohibition flag is not "1". Therefore, the electric motor 42 is caused to perform release driving in response to the release request generated at the time t3 (step S814). In the example of FIG. 11, the release driving state of the electric motor 42 is completed at the time t4 ("NO" in step S812).

According to the second embodiment, similar to the first embodiment, when the electric motor 42 is in a pressurize driving state, it is possible to prohibit the reactivation of the engine by the idle stop control unit 12. Furthermore, when pressurize driving the electric motor 42 during the reactivation of the engine by the idle stop control unit 12, it is possible to discontinue the reactivation of the engine. Therefore, it is possible to prevent a situation where both the pressurize driving state of the electric motor 42 and the driving state of the starter 30 for the reactivation of the engine by the idle stop control unit 12, are realized at the same time. Accordingly, the load on the battery 80 can be reduced, compared to a configuration in which the driving state of the electric motor 42 and the driving state of the starter 30 may be realized at the same time when reactivating the engine. Furthermore, the pressurize driving is prioritized over the reactivation of the engine, and therefore it is possible to avoid inconveniences (for example, the vehicle slips down) that may arise when pressurize driving is executed after the reactivation of the engine.

Furthermore, in the second embodiment, the reactivation condition is established when a release request is generated, and when the reactivation condition is established, the EPB release prohibition flag is set to "1". Accordingly, the reactivation condition will not be established during the release driving of the electric motor 42. Furthermore, when the engine is being reactivated by the idle stop control unit 12, the EPB release prohibition flag is maintained at "1". Therefore, it is possible to prevent a situation where both the release driving of the electric motor 42 and the driving state of the starter 30 for the reactivation of the engine by the idle stop control unit 12, are realized at the same time. Accordingly, the load on the battery 80 can be reduced, compared to a configuration in which the driving state of the electric motor 42 and the driving state of the starter 30 may be realized at the same time when reactivating the engine. Furthermore, the reactivation of the engine is prioritized over the release driving, and therefore it is possible to avoid inconveniences (for example, the vehicle slips down) that may arise when reactivation of the engine is executed after release driving.

Furthermore, in the second embodiment, similar to the first embodiment, the electric parking brake device 40 is operated in response to input from the driver via the EPB switch 50. That is, the EPB control unit 14 causes the electric motor 42 to perform pressurize driving in response to a pressurizing request, and causes the electric motor 42 to perform release driving in response to a release request. Therefore, according to the second embodiment, the electric parking brake device 40 can be configured to operate in response to input from the driver, and therefore it is possible to realize a drive mode in which the driver's intention is reflected. However, in the second embodiment, release driving is prohibited, and therefore the extent to which the intention of the driver's intention is reflected is decreased compared to the first embodiment described above.

Preferred embodiments of the present invention are described above; however, the present invention is not limited to the specific embodiments described herein, and variations and modifications may be made without departing from the spirit and scope of the present invention.

For example, in the first and second embodiments described above, the operation of the electric parking brake device is realized according to input from the EPB switch 50; however, as another mode, it may be possible to select an automatic mode. In this case, in the automatic mode, the operation of the electric parking brake device (pressurize driving and release driving of the electric motor 42) is automatically realized according to, for example, the control state of the idle stop control unit 12.

Furthermore, in the first and second embodiments described above, the EPB switch 50 may be able to generate a release request, not only in the pressurize state but also in the pressurize driving state. Similarly, the EPB switch 50 may be able to generate a pressurizing request, not only in the release state but also in the release driving state.

Furthermore, in the first and second embodiments described above, the function of the mediating unit 16 may be realized by the idle stop control unit 12 and the EPB control unit 14. For example, in the first embodiment described above (similarly in the second embodiment), when the idle stop control unit 12 executes the process of the mediating unit 16 of FIG. 4, the idle stop control unit 12 may determine whether the electric motor 42 is not in a driving state, instead of the processes of steps S210 and step S304. Furthermore, in the second embodiment described above, when the EPB control unit 14 executes the process of the mediating unit 16 of FIG. 9, the EPB control unit 14 may determine whether the executing S&S flag is "0", instead of the process of step S808.

Furthermore, in the process of FIG. 3, when discontinuing the reactivation of the engine in step S314, the idle stop control unit 12 does not change the executing reactivation flag or the reactivation condition establish flag to "0". Accordingly, once the reactivation condition is established, subsequently, even when the reactivation of the engine is discontinued because the reactivation prohibition flag changes to "1", it is possible to reactivate the engine after the driving of the electric motor 42 is completed (that is, when the reactivation prohibition flag becomes "0"), without determining the reactivation condition again. However, when discontinuing the reactivation of the engine in step S314, the idle stop control unit 12 may change the executing reactivation flag and the reactivation condition establish flag to "0", according to a processes similar to those of steps S308 and S310. In this case, the reactivation condition is determined again (see step S206).

Furthermore, in the process of FIG. 4 (similarly in FIG. 7), when the mediating unit 16 determines that the electric motor 42 is in a driving state in step S402, the mediating unit 16 may determine whether the electric parking brake device 40 is normal. When the electric parking brake device 40 is normal, the process may proceed to step S404, and otherwise, the process may proceed to step S408. In this case, when the electric parking brake device 40 is not normal (and accordingly, pressurize driving or release driving is not normally completed), it is possible to reactivate the engine, which has been prohibited/discontinued because the reactivation prohibition flag is "1".

Furthermore, in the first embodiment described above, the mediating unit 16 sets the reactivation prohibition flag to "1", both in the case where the electric motor 42 is in a pressurize driving state and in the case where the electric motor 42 is in a release driving state (see FIG. 4); however, the embodiment is not so limited. That is, the mediating unit 16 may set the reactivation prohibition flag to "1", in only either the case where the electric motor 42 is in a pressurize driving state or the case where the electric motor 42 is in a release driving state. In this case, the engine may be reactivated when the electric motor 42 is in either one of the driving states of the pressurize driving state or the release driving state; however, reactivation of the engine is prohibited when the electric motor 42 is in the other one of the driving states of the pressurize driving state or the release driving state. Therefore, in this configuration also, the load on the battery 80 can be reduced, compared to a configuration in which the engine can be reactivated both in the case where the electric motor 42 is in a pressurize driving state and in the case where the electric motor 42 is in a release driving state.

Furthermore, in the second embodiment described above, the reactivation condition is satisfied when a release request is generated; however, the reactivation condition may not be satisfied when a release request is generated. In this case, in the process of FIG. 9, in step S900, the mediating unit 16 determines whether the engine is being reactivated by the idle stop control unit 12. The determination as to whether the engine is being reactivated may be made based on whether the executing reactivation flag is "1". Alternatively, the mediating unit 16 may determine whether the reactivation condition establish flag is "1", instead of whether the executing reactivation flag is "1". Alternatively, the mediating unit 16 may determine that the engine is being reactivated, from when the executing reactivation flag (or the reactivation condition establish flag) becomes "1" to when the driving of the starter 30 is completed. When the engine is being reactivated, the process proceeds to step S902, and otherwise, the process proceeds to step S906. In this modified example, the reactivation condition may be established during the release driving according to a release request.

When the reactivation condition is established during the release driving according to a release request, both driving states are allowed, or the release driving is discontinued, and reactivation of the engine is executed.

Furthermore, in the second embodiment described above, when a release request is generated during reactivation after the reactivation starting point, the release driving of the electric motor 42 according to the release request is prohibited (see FIG. 11); however, the vehicle engine activation control system 1 may have a configuration in which the prohibition is not executed. In such a configuration also, when a release request is generated during engine automatic stop or after completion of engine automatic stop, by prohibiting the release driving of the electric motor 42 according to the release request (see FIG. 10), the load on the battery 80 can be reduced with respect to the engine reactivation in response to the release request.

Furthermore, in the second embodiment described above, the mediating unit 16 sets the reactivation prohibition flag to "1", only in the case where the electric motor 42 is in a pressurize driving state (see FIG. 7); however, an opposite case is also applicable. That is, the mediating unit 16 may set the reactivation prohibition flag to "1", only in the case where the electric motor 42 is in a release driving state. In this case, the processes of FIGS. 8 and 9, in which "release" is replaced with "pressurize", may be executed instead of the processes of FIGS. 8 and 9. Furthermore, in this case, the condition (7) relevant to the reactivation condition may be replaced with the following condition (7-1).

Condition (7-1) A pressurizing request is generated by operating the EPB switch 50.

In the following, the above modified example is referred to as "modified example 2". In modified example 2, when a pressurizing request is generated during reactivation, the release driving of the electric motor 42 according to the pressurizing request is prohibited; however, the vehicle engine activation control system 1 may have a configuration in which the prohibition is not executed. In such a configuration also, when a pressurizing request is generated during engine automatic stop or after completion of engine automatic stop, by prohibiting the pressurize driving of the electric motor 42 according to the pressurizing request, the load on the battery 80 can be reduced with respect to the engine reactivation in response to the pressurizing request. Furthermore, in the modified example 2, the condition (7-1) relevant to the reactivation condition may be omitted. In the following, this further modified example is referred to as "modified example 3". In this case, in the process of FIG. 9, in step S900, the mediating unit 16 determines whether the engine is being reactivated by the idle stop control unit 12. In the modified example 3, the reactivation condition may be established during pressurize driving according to the pressurizing request. However, when the reactivation condition is established during the pressurize driving according to a pressurizing request, both driving states are allowed, or the pressurize driving is discontinued, and reactivation of the engine is executed.

Furthermore, in the example of FIG. 8, even when a release request is generated once, if the release driving relevant to the release request is prohibited because the EPB release prohibition flag is "1", it is necessary to generate a new release request in order to realize release driving. However, the present example is not so limited. For example, as long as the EPB abnormality flag is "0", once a release request is generated, even when the release driving relevant to the release request is prohibited because the EPB release prohibition flag is "1", a release driving wait state relevant to the release request may be realized (a state of waiting for the EPB release prohibition flag to become "0"). In this case, for example, assuming that a driver operates the EPB switch 50 to generate a release request after the engine automatic stop is completed, the release driving is prohibited (waited), and the engine is reactivated; however, the release driving is realized after the engine is reactivated (without the need of operating the EPB switch 50 again).

According to the embodiments, it is possible to provide a vehicle engine activation control system capable of reducing the load on the battery when reactivating the engine according to idle stop control, while configuring the electric parking brake device to operate according to input from the driver.

The present application is based on and claims the benefit of priority of Japanese Priority Application No. 2015-089754, filed on Apr. 24, 2015, the entire contents of which are hereby incorporated herein by reference.

What is claimed is:

1. A vehicle engine activation control system comprising:
a starter connected to a battery;
an idle stop control unit configured to automatically stop an engine and automatically reactivate the engine by the starter;
an input unit configured to generate an operation request in response to input received from a driver;
an electric parking brake device including an electric motor connected to the battery, wherein the electric motor starts driving in response to the operation request; and
a mediating unit configured to prohibit the reactivation of the engine by the idle stop control unit, when the electric motor is in a driving state in response to the operation request being a predetermined operation request, wherein the predetermined operation request includes at least one of: (i) a pressurizing request for requesting, in a release state of the electric parking brake device, a pressurize state of the electric parking brake device in which a braking force is applied on a wheel, and (ii) a release request for requesting, in the pressurize state of the electric parking vehicle, for the release state of the electric parking brake device in which the braking force applied on the wheel is released.

2. The vehicle engine activation control system according to claim 1, wherein
the predetermined operation request is the pressurizing request,
the idle stop control unit automatically reactivates the engine when the release request is generated while the engine is automatically stopping or after the automatic stopping of the engine is completed, and
the mediating unit further prohibits the driving of the electric motor in response to the release request, at least during the reactivation of the engine, when the idle stop control unit automatically reactivates the engine in response to the release request.

3. The vehicle engine activation control system according to claim 1, wherein
the predetermined operation request is the pressurizing request, and
the mediating unit further prohibits the driving of the electric motor in response to the release request, at least during the reactivation of the engine, when the release request is generated while the engine is being reactivated by the idle stop control unit.

4. A vehicle engine activation control system comprising:

a starter connected to a battery;

an idle stop control unit configured to automatically stop an engine and automatically reactivate the engine by the starter;

an input unit configured to generate an operation request in response to input received from a driver;

an electric parking brake device including an electric motor connected to the battery, wherein the electric motor starts driving in response to the operation request; and a mediating unit configured to prohibit the reactivation of the engine by the idle stop control unit, when the electric motor is in a driving state in response to the operation request being a predetermined operation request, wherein the idle stop control unit reactivates the engine after the driving of the electric motor is completed, when the mediating unit prohibits the reactivation of the engine.

5. A vehicle engine activation control system comprising:

a starter connected to a battery;

an idle stop control unit configured to automatically stop an engine and automatically reactivate the engine by the starter;

an input unit configured to generate an operation request in response to input received from a driver;

an electric parking brake device including an electric motor connected to the battery, wherein the electric motor starts driving in response to the operation request; and a mediating unit configured to prohibit the reactivation of the engine by the idle stop control unit, when the electric motor is in a driving state in response to the operation request being a predetermined operation request, wherein the mediating unit further discontinues the reactivation of the engine, when the predetermined operation request is generated while the engine is being reactivated by the idle stop control unit, and the idle stop control unit reactivates the engine after the driving of the electric motor is completed in response to the predetermined operation request, when the mediating unit discontinues the reactivation of the engine.

* * * * *